United States Patent Office.

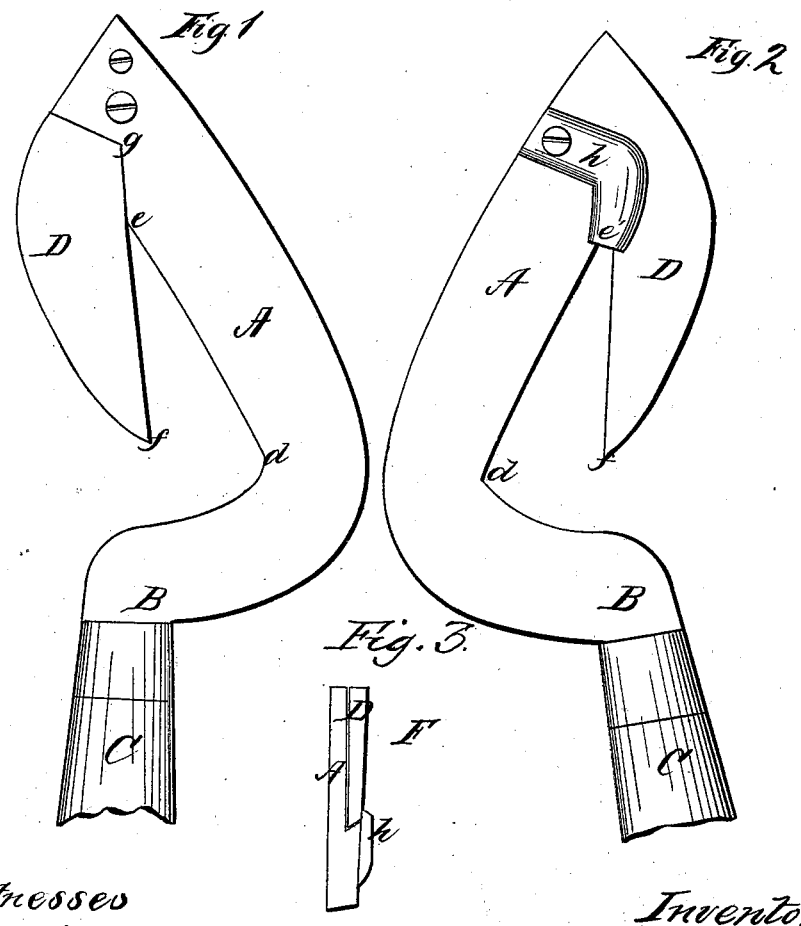

JOHN STARK, OF THOMASVILLE, GEORGIA.

Letters Patent No. 79,700, dated July 7, 1868.

IMPROVEMENT IN PRUNING-HOOK.

*The Schedule referred to in these Letters Patent and making part of the same.*

TO ALL WHOM IT MAY CONCERN:

Be it known that I, JOHN STARK, of Thomasville, in the county of Thomas, and State of Georgia, have invented a new and useful Improvement in Pruning and Harvesting-Hook; and I do hereby declare that the following is a full, clear, and exact description thereof, which will enable those skilled in the art to make and use the same, reference being had to the accompanying drawings, forming part of this specification.

This invention relates to an improvement in hooks for harvesting or cutting up corn, and also for pruning trees; and it consists in making the hook or cutting-edges in two or more parts, united together and operating as hereinafter more fully described.

Figure 1 represents one side of the hook, showing the cutting-edges formed of two pieces, united together so as to form an acute angle.

Figure 2 is a view of the other side of the hook, where a third piece is seen covering a portion of the cutting-edges in fig. 1, and forming itself a cutting-edge in the angle.

Figure 3 shows the form of the joint where the two principal parts of the hook are united, it being an edge view.

Similar letters of reference indicate corresponding parts.

A is the knife, which is somewhat in the sickle-form, and which is attached to the handle by the shank B. C is the handle. The knife is ground to a cutting-edge from the point $d$ to the angle $e$. D is the piece which forms the hook, which is halved and dove-tailed on to A, as seen in fig. 3. This piece D is ground to a cutting-edge from the point $f$ to the point $g$.

The two pieces are secured together by screws, so that they may be separated for grinding or sharpening. These cutting-edges are straight, so that they can be sharpened without difficulty.

$h$ is a third cutting-blade, which is attached to the main knife A, by a screw, as seen in the drawing, and by a pin or projection on its under side, which enters a cavity or hole in the knife for keeping it in place.

When the two main parts are separated for sharpening, this third blade $h$ may be turned round without removing it. This blade $h$ may be set so as to cover more or less of the angle, as may be desired, and the main cutting-blades or edges may be arranged in regard to each other, so as to stand at any desired angle to suit the purpose for which the hook is intended.

I claim as new, and desire to secure by Letters Patent—

1. A harvesting or pruning-hook, formed of two or more cutting-edges, when the same are united and arranged substantially as described for the purposes set forth.

2. Attaching the hook D and blade A together, as described, whereby they are rendered detachable for sharpening, as herein shown and described.

JOHN STARK.

Witnesses:
ADOLPH HAMEISTER,
JAMES KOTTMAN.